(12) United States Patent
Yang et al.

(10) Patent No.: US 8,329,830 B2
(45) Date of Patent: *Dec. 11, 2012

(54) SURFACE TREATMENT PROCESS AND TREATED ARTICLE

(75) Inventors: Yu Yang, Eden Prairie, MN (US); George G. I. Moore, Afton, MN (US); Thomas P. Klun, Lakeland, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 209 days.

This patent is subject to a terminal disclaimer.

(21) Appl. No.: 12/792,153

(22) Filed: Jun. 2, 2010

(65) Prior Publication Data

US 2010/0331487 A1 Dec. 30, 2010

Related U.S. Application Data

(60) Provisional application No. 61/221,575, filed on Jun. 30, 2009, provisional application No. 61/221,574, filed on Jun. 30, 2009.

(51) Int. Cl.
C08F 283/00 (2006.01)
C08G 77/62 (2006.01)
(52) U.S. Cl. ........ 525/474; 525/476; 525/477; 525/479; 528/25; 528/26; 528/27; 528/28; 528/29
(58) Field of Classification Search .................. 525/474, 525/476, 477, 479; 528/25–29
See application file for complete search history.

(56) References Cited

U.S. PATENT DOCUMENTS

| | | | |
|---|---|---|---|
| 2,823,218 A | 2/1958 | Speier et al. | |
| 2,970,150 A | 1/1961 | Bailey | |
| 3,159,601 A | 12/1964 | Ashby | |
| 3,159,662 A | 12/1964 | Ashby | |
| 3,220,972 A | 11/1965 | Lamoreaux | |
| 3,250,808 A | 5/1966 | Moore et al. | |
| 3,516,946 A | 6/1970 | Modic | |
| 3,814,730 A | 6/1974 | Karstedt | |
| 4,029,629 A | 6/1977 | Jeram | |
| 4,469,522 A * | 9/1984 | Matsumoto | 524/588 |
| 4,504,645 A | 3/1985 | Melancon | |
| 4,510,094 A | 4/1985 | Drahnak | |
| 4,530,879 A | 7/1985 | Drahnak | |
| 4,533,575 A | 8/1985 | Melancon | |
| 4,678,688 A * | 7/1987 | Itoh et al. | 427/387 |
| 4,845,268 A | 7/1989 | Ohsaka et al. | |
| 4,904,417 A | 2/1990 | Ohsaka et al. | |
| 4,929,704 A | 5/1990 | Schwark | |
| 5,001,090 A | 3/1991 | Schwark | |
| 5,008,422 A * | 4/1991 | Blum et al. | 556/412 |
| 5,021,533 A | 6/1991 | Schwark | |
| 5,032,649 A | 7/1991 | Schwark | |
| 5,145,886 A | 9/1992 | Oxman et al. | |
| 5,206,327 A | 4/1993 | Matsumoto et al. | |
| 5,344,907 A | 9/1994 | Schwark et al. | |
| 5,354,922 A | 10/1994 | Marchionni et al. | |
| 5,386,006 A | 1/1995 | Matsumoto | |
| 5,464,918 A | 11/1995 | Schwark | |
| 5,520,978 A | 5/1996 | Boardman et al. | |
| 5,558,908 A | 9/1996 | Lukacs et al. | |
| 5,616,650 A | 4/1997 | Becker et al. | |
| 5,637,641 A | 6/1997 | Becker et al. | |
| 5,741,552 A | 4/1998 | Takayama et al. | |
| 5,747,623 A | 5/1998 | Matsuo et al. | |
| 5,843,526 A | 12/1998 | Lukacs et al. | |
| 6,165,551 A | 12/2000 | Lukacs et al. | |
| 6,329,487 B1 | 12/2001 | Abel et al. | |
| 6,534,184 B2 | 3/2003 | Knasiak et al. | |
| 6,652,978 B2 | 11/2003 | Lukacs, III et al. | |
| 6,664,354 B2 | 12/2003 | Savu et al. | |
| 6,756,469 B2 | 6/2004 | Lukacs, III | |
| 7,294,731 B1 | 11/2007 | Flynn et al. | |
| 7,335,786 B1 | 2/2008 | Iyer et al. | |
| 7,345,123 B2 | 3/2008 | Qiu et al. | |
| 2002/0105728 A1 | 8/2002 | Yamaguchi et al. | |
| 2003/0013923 A1 | 1/2003 | Marchionni et al. | |
| 2005/0054804 A1 | 3/2005 | Dams et al. | |
| 2005/0250921 A1 | 11/2005 | Qiu et al. | |
| 2006/0246221 A1 | 11/2006 | Falk et al. | |
| 2007/0254975 A1 | 11/2007 | Arney et al. | |

(Continued)

FOREIGN PATENT DOCUMENTS

JP 03/290437 12/1991

(Continued)

OTHER PUBLICATIONS

Machine Translation of JP 08027425 A.*
Kubo et al., "Preparation of Hot Water-Resistant Silica Thin Films from Polysilazane Solution at Room Temperature," Journal of Sol-Gel Science and Technology 31, 257-261 (2004).
C. Vu et al., "Advanced Coating Materials Based on Polysilazanes," paper presented at The Nurnberg Congress, European Coating Show 2007, May 7, 2007.
International Patent Application No. PCT/US2010/060781, "Process for Preparing Shelf-Stable Curable Polysilazanes, and Polysilazanes Prepared Thereby," International Filing Date Dec. 16, 2010.
International Search Report, PCT/US2010/039900, International Filing Date Jun. 25, 2010.

*Primary Examiner* — Randy Gulakowski
*Assistant Examiner* — Mike M Dollinger
(74) *Attorney, Agent, or Firm* — Lucy C. Weiss

(57) ABSTRACT

A surface treatment process comprises (a) providing at least one substrate having at least one major surface; (b) combining (1) at least one curable oligomeric or polymeric polysilazane comprising at least one chemically reactive site, and (2) at least one fluorochemical compound comprising (i) at least one organofluorine or heteroorganofluorine moiety that comprises at least about six perfluorinated carbon atoms, and (ii) at least one functional group that is capable of reacting with the polysilazane through at least one of the chemically reactive sites; (c) allowing or inducing the polysilazane and the fluorochemical compound to react to form at least one curable organofluorine-modified polysilazane; (d) applying the curable organofluorine-modified polysilazane or its precursors to at least a portion of at least one major surface of the substrate; and (e) curing the curable organofluorine-modified polysilazane to form a surface treatment.

18 Claims, No Drawings

U.S. PATENT DOCUMENTS

| | | |
|---|---|---|
| 2008/0220264 A1 | 9/2008 | Iyer et al. |
| 2010/0015453 A1 | 1/2010 | Yamaguchi et al. |
| 2010/0331498 A1 | 12/2010 | Yang et al. |

FOREIGN PATENT DOCUMENTS

| | | | |
|---|---|---|---|
| JP | 03290437 A | * | 12/1991 |
| JP | 07/196987 | | 8/1995 |
| JP | 08027425 A | * | 1/1996 |
| JP | H08-027425 | | 1/1996 |
| JP | 10026703 A | * | 1/1998 |
| WO | WO 02/44264 | | 6/2002 |
| WO | WO 2011/002666 | | 1/2011 |

* cited by examiner

SURFACE TREATMENT PROCESS AND TREATED ARTICLE

STATEMENT OF PRIORITY

This application claims the priority of U.S. Provisional Application Nos. 61/221,575 and 61/221,574 filed Jun. 30, 2009, the contents of which are hereby incorporated by reference.

FIELD

This invention relates to methods of treating substrates (especially substrates having a hard surface such as, for example, ceramics or glass) to impart water, oil, stain, and/or dirt repellency to a surface thereof, and, in another aspect, this invention relates to substrates treated thereby.

BACKGROUND

Numerous fluorinated compositions have been used as coating compositions for application to substrates (for example, hard surface substrates and fibrous substrates) to impart low surface energy characteristics such as oil and/or water repellency (oleophobicity and/or hydrophobicity). When used in coatings or films, however, many fluorinated materials have tended to diffuse to the surface of the coating or film and to become depleted over time (for example, due to repeated cleanings of the surface).

This has led to the use of fluorinated derivatives having reactive or functional groups (for example, fluorinated polyether thiols) to enable covalent attachment to the coatings, films, or substrate surfaces. The preparation of such functional derivatives has often required the use of complex, multi-step processes, the use of difficult-to-prepare intermediates, and/or has resulted in a product mixture rather than substantially purely the desired derivative compound.

Other approaches to improving durability have involved the use of primers (for example, polysilazanes) to pretreat substrate surfaces prior to application of a fluorinated composition. This has required the use of multiple process steps (and often the use of expensive materials), however, and thus has resulted in additional time, additional expense, and/or less compatibility with existing manufacturing processes.

Finally, the various fluorinated surface treatments have varied in their ease of applicability to substrates (for example, due to differences in viscosity and/or in solvent solubilities), in their requisite curing conditions (for example, some requiring relatively high curing temperatures for relatively long periods of time), in their repellency levels, in their ease of cleaning, in their degrees of optical clarity, in their chemical resistance, and/or in their solvent resistance. Many have also been at least somewhat substrate-specific, requiring production of multiple compositions to ensure adhesion to different substrates.

SUMMARY

Thus, we recognize that there exists an ongoing need for surface treatment processes (and fluorinated compositions for use therein) that can meet the performance requirements of a variety of different surface treatment applications. Such processes will preferably be simple, cost-effective, compatible with existing manufacturing methods, and/or capable of imparting repellency (preferably, durable, tailored repellency) to a variety of different substrates.

Briefly, in one aspect, this invention provides a surface treatment process. The process comprises (a) providing at least one substrate having at least one major surface;
(b) combining
  (1) at least one curable oligomeric or polymeric polysilazane comprising at least one chemically reactive site selected from silicon-nitrogen bonds, silicon-hydrogen bonds, carbon-carbon double bonds, nitrogen-hydrogen bonds, and combinations thereof, and
  (2) at least one fluorochemical compound comprising
    (i) at least one organofluorine or heteroorganofluorine moiety that comprises at least about six perfluorinated carbon atoms, and
    (ii) at least one functional group that is capable of reacting with the curable oligomeric or polymeric polysilazane through at least one of the chemically reactive sites;
(c) allowing or inducing the curable oligomeric or polymeric polysilazane and the fluorochemical compound to react to form at least one curable organofluorine-modified (that is, covalently modified by the organofluorine or heteroorganofluorine moiety) polysilazane;
(d) applying the curable organofluorine-modified polysilazane or its precursors to at least a portion of at least one major surface of the substrate; and
(e) curing the curable organofluorine-modified polysilazane to form a surface treatment.

Preferably, the organofluorine or heteroorganofluorine moiety of the fluorochemical compound is a perfluorinated moiety (more preferably, a perfluoroalkyl, perfluoroalkylene, perfluoroheteroalkyl, or perfluoroheteroalkylene moiety; most preferably, a perfluoropolyether moiety).

It has been discovered that a versatile new class of hybrid organic/inorganic polymers can be produced, for example, by a relatively simple one-step reaction of inorganic or organic polysilazanes with functional group-containing fluorochemical compounds. The resulting organofluorine-modified polysilazanes surprisingly retain the curability of the starting polysilazanes, can have relatively long shelf lives in the absence of moisture, and can be cured to form crosslinked networks.

The properties of the crosslinked networks can be tailored to the requirements of various different applications by varying the nature and relative amount of the starting polysilazane (for example, the chemical nature of its substituents, which determines its degree of organic content and the curing agents that can be effective) and the nature and relative amount of the starting fluorochemical compound (for example, the chemical nature and fluorine content of the organofluorine or heteroorganofluorine moiety). In particular, the organofluorine or heteroorganofluorine content of the starting fluorochemical compounds can be used to modify or tune the surface properties of the crosslinked networks for use in applications where the presence of fluorine can be advantageous (for example, applications requiring certain low surface energy characteristics).

Use of as little as about 0.1 weight percent of the fluorochemical compound (based upon the total weight of the starting fluorochemical compound and the starting polysilazane), can provide useful low surface energy characteristics in the crosslinked networks. The crosslinked networks can exhibit, for example, advancing contact angles as high as about 128 degrees with water and as high as about 72 degrees with hexadecane. The organofluorine-modified polysilazanes can therefore be useful as fluorinated surface treatments to impart a relatively high degree of hydrophobicity and/or oleophobicity to a variety of substrates (for example, for surface protection or to enhance ease of cleaning).

The curable organofluorine-modified polysilazanes can be coated in neat form (due to their relatively low viscosities) or can be easily dissolved in any of a variety of solvents and then coated on desired substrates. The coated polymers can be cured in various different ways (depending upon the needs of a particular application) to provide relatively highly crosslinked, relatively optically clear hardcoats. In addition to the low surface energy characteristics of the hardcoats (for example, water, oil, ink, and/or stain repellency and anti-graffiti properties), the hardcoats surprisingly can maintain many of the characteristics associated with polysilazanes (for example, relatively high hardness, ultraviolet transparency, corrosion resistance, thermal stability, fire resistance, chemical resistance, wear and abrasion resistance, and/or the like).

The hardcoats can exhibit adhesion to a variety of different substrates (for example, wood, metal, ceramics, and polymers). Surprisingly, relatively durable repellency characteristics can be imparted to the substrates by using a simple, one-step coating process, without the need for expensive primers or for an inventory of multiple substrate-specific surface treatment compositions.

Thus, at least some embodiments of the process of the invention meet the above-described, ongoing need for treatment processes (and fluorinated compositions for use therein) that can fulfill the performance requirements of a variety of different surface treatment applications, while preferably being simple, cost-effective, compatible with existing manufacturing methods, and/or capable of imparting repellency (preferably, durable, tailored repellency) to a variety of different substrates. The hardcoats (with their often outstanding durability, adhesion, and repellency properties) can be widely used for applications requiring durable low surface energy characteristics (for example, anti-graffiti coatings for signs, buildings, transportation vehicles, and the like; easily cleanable coatings for metals, ceramic tiles, electronic devices, and the like; mold release coatings for polymer or composite molding; and the like).

In another aspect, this invention also provides a surface-treated article comprising at least one substrate having at least one major surface, the substrate bearing, on at least a portion of at least one of the major surfaces, a surface treatment prepared by the above-described process of the invention.

DETAILED DESCRIPTION

In the following detailed description, various sets of numerical ranges (for example, of the number of carbon atoms in a particular moiety, of the amount of a particular component, or the like) are described, and, within each set, any lower limit of a range can be paired with any upper limit of a range.

DEFINITIONS

As used in this patent application:

"catenated heteroatom" means an atom other than carbon (for example, oxygen, nitrogen, or sulfur) that replaces one or more carbon atoms in a carbon chain (for example, so as to form a carbon-heteroatom-carbon chain or a carbon-heteroatom-heteroatom-carbon chain);

"cure" means conversion to a crosslinked polymer network (for example, through irradiation or catalysis);

"fluoro-" (for example, in reference to a group or moiety, such as in the case of "fluoroalkylene" or "fluoroalkyl" or "fluorocarbon") or "fluorinated" means only partially fluorinated such that there is at least one carbon-bonded hydrogen atom;

"fluorochemical" means fluorinated or perfluorinated;

"heteroorganic" means an organic group or moiety (for example, an alkyl or alkylene group) containing at least one heteroatom (preferably, at least one catenated heteroatom);

"mercapto" means a monovalent group or moiety of formula —SH;

"oligomer" means a molecule that comprises at least two repeat units and that has a molecular weight less than its entanglement molecular weight; such a molecule, unlike a polymer, exhibits a significant change in properties upon the removal or addition of a single repeat unit;

"perfluoro-" (for example, in reference to a group or moiety, such as in the case of "perfluoroalkylene" or "perfluoroalkyl" or "perfluorocarbon") or "perfluorinated" means completely fluorinated such that, except as may be otherwise indicated, there are no carbon-bonded hydrogen atoms replaceable with fluorine;

"perfluoroether" means a group or moiety having two saturated or unsaturated perfluorocarbon groups (linear, branched, cyclic (preferably, alicyclic), or a combination thereof) linked with an oxygen atom (that is, there is one catenated oxygen atom);

"perfluoropolyether group (or segment or moiety)" means a group or moiety having three or more saturated or unsaturated perfluorocarbon groups (linear, branched, cyclic (preferably, alicyclic), or a combination thereof) linked with oxygen atoms (that is, there are at least two catenated oxygen atoms);

"polysilazane" refers to compounds having at least one of a linear, branched, or cyclic main chain or backbone comprising a plurality of Si—N linkages;

"polysiloxazane" refers to compounds having at least one of a linear, branched, or cyclic main chain or backbone comprising both Si—N and Si—O linkages; for simplicity, in this patent application, "polysilazane" also includes "polysiloxazane" and "polyureasilazane";

"polyureasilazane" refers to compounds having at least one of a linear, branched, or cyclic main chain or backbone comprising a plurality of Si—N linkages and having at least one carbonyl group bonded to each of two nitrogen atoms;

"substituted aryl" group means an aryl group substituted by non-interfering (with cure) atoms such as one or more of halogens, alkyl groups, and heteroalkyl groups; and "sulfonamido" means a divalent group or moiety of formula —SO$_2$N(R')—, wherein R' is hydrogen or alkyl (for example, selected from alkyl groups having from one to about four carbon atoms).

Polysilazanes

Polysilazanes suitable for use in the process of the invention include curable oligomeric or polymeric polysilazanes comprising at least one chemically reactive site selected from silicon-nitrogen bonds (or linkages), silicon-hydrogen bonds, carbon-carbon double bonds, and combinations thereof. The polysilazanes have main chains or backbones that comprise structural units having the following general formula:

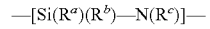    Formula I wherein each $R^a$, each $R^b$, and each $R^c$ is independently hydrogen, an organic group, a heteroorganic group, or a combination thereof. Suitable organic and heteroorganic groups include alkyl, alkenyl, cycloalkyl, aryl, aralkyl, alkylsilyl, arylsilyl, alkylamino, arylamino, alkoxy, aryloxy, aralkyloxy, and the like, and combinations thereof (preferably, alkyl, alkenyl, cycloalkyl, aryl, aralkyl, alkoxy, aryloxy, aralkyloxy, and combinations thereof); the groups preferably having from 1 to about 18 carbon atoms (more preferably, 1 to about 12 carbon atoms; even more preferably, 1 to about 8 carbon atoms; most preferably, 1 to about 2 carbon atoms (for example, methyl or vinyl)). The groups can be further substituted with one or more substituent groups such as halogen, alkoxy, amino, carboxyl, hydroxyl, alkoxycarbonyl, nitro, and the like, and combinations thereof. Preferably, the polysilazanes are liquids.

Useful polysilazanes include those having linear, branched, or cyclic structures, or a combination thereof, and/or include those having number average molecular weights of about 100 to about 50,000 (preferably, about 200 to about 10,000). Modified polysilazanes such as polymetallosilazanes or silazane copolymers can be utilized. Useful polysilazanes include those that have random, alternating, or block polymer structures, or a combination thereof.

The polysilazanes can be prepared by methods that are known in the art. For example, polyorganosilazanes, as well as perhydropolysilazane (wherein all of $R^a$, $R^b$, and $R^c$ in Formula I above are hydrogen), can be prepared through ammonolysis of dichlorosilanes and, optionally, subsequent base-catalyzed dehydrogenative coupling. Polyorganosilazanes and perhydropolysilazane are also commercially available. The polysilazanes can be used in the composition of the invention singly or in the form of mixtures with one or more of themselves or with one or more other types of polymers.

Useful polysilazanes include those linear polysilazanes that can be represented by the following general formula:

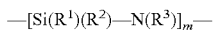   Formula II wherein each $R^1$ and each $R^2$ are independently hydrogen, a linear, branched, or cyclic alkyl group having fewer than about 9 carbon atoms, a linear, branched, or cyclic heteroalkyl group having fewer than about 7 carbon atoms, a substituted or unsubstituted aryl group having fewer than about 13 carbon atoms, an ethylenically unsaturated group, a ring structure formed from $R^1$ and $R^2$, taken together, having fewer than about 8 carbon atoms, or a combination thereof; each $R^3$ is independently hydrogen, a linear or branched alkyl group having fewer than about 7 carbon atoms, a linear or branched heteroalkyl group having fewer than about 7 carbon atoms, or a combination thereof; and m is a positive integer. Preferably, each $R^1$ and each $R^2$ are independently selected from hydrogen, methyl, phenyl, and vinyl, and each $R^3$ is preferably hydrogen. The number average molecular weight of the polysilazanes of Formula II can range from about 160 grams per mole to about 10,000 grams per mole (preferably from about 300 grams per mole to about 7,000 grams per mole; more preferably, from about 500 grams per mole to about 3,000 grams per mole; most preferably, from about 700 grams per mole to about 2,000 grams per mole).

Useful cyclic polysilazanes include those that can be represented by the following general formula:

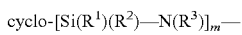   Formula III wherein $R^1$, $R^2$, $R^3$, and m are as defined above for the polysilazanes of Formula II. The number average molecular weight of the cyclic polysilazanes of Formula III can range from about 160 grams per mole to about 3,000 grams per mole (preferably, from about 300 grams per mole to about 2000 grams per mole; more preferably, from about 350 grams per mole to about 1500 grams per mole). Other useful cyclic polysilazanes include those that comprise both linear and cyclic polysilazane moieties.

Useful branched polysilazanes include those generally represented by Formula II (linear polysilazanes with branches) or Formula III (cyclic polysilazanes with branches), where either or both of $R^1$ and $R^2$ in at least one of the repeat units of the polysilazanes have a structure that can be represented by the following general formula:

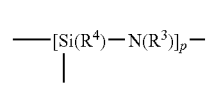   Formula IV wherein each $R^3$ is as defined above for Formula II, each $R^4$ is independently hydrogen, a linear, branched, or cyclic alkyl group having fewer than about 9 carbon atoms, a linear, branched, or cyclic heteroalkyl group having fewer than about 7 carbon atoms, a substituted or unsubstituted aryl group having fewer than about 13 carbon atoms, an ethylenically unsaturated group, or a combination thereof, and p is a positive integer that is generally smaller than m. Preferably, each $R^4$ is independently selected from hydrogen, methyl, phenyl, and vinyl, and each $R^3$ is preferably hydrogen. The number average molecular weight of the branched polysilazanes can range from about 160 grams per mole to about 3,000 grams per mole (preferably, from about 300 grams per mole to about 2000 grams per mole; more preferably, from about 350 grams per mole to about 1500 grams per mole). Other useful branched polysilazanes include those that comprise multiple branches and those that comprise cyclic polysilazane moieties.

Useful polysilazanes include linear polysiloxazanes that can be represented by the following general formula:

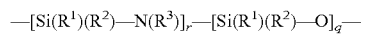   Formula V wherein $R^1$, $R^2$, and $R^3$ are as defined above for Formula II; and r and q are positive integers (preferably, r is at least about 4 times the magnitude of q). Such polysiloxazanes can exhibit random, alternating, or block structures (or a combination thereof; preferably, a block structure) formed by the silazane (Si—N) and siloxane (Si—O) units. The number average molecular weight of the polysiloxazanes of Formula V can range from about 160 grams per mole to about 10,000 grams per mole (preferably, from about 300 grams per mole to about 7,000 grams per mole; more preferably, from about 500 grams per mole to about 3,000 grams per mole; most preferably, from about 700 grams pre mole to about 2,000 grams per mole).

Useful polysiloxazanes also include those that are cyclic or branched. Useful cyclic polysiloxazanes include polysiloxazanes that have cyclic portions that include Si—O linkages and polysiloxazanes in which the Si—O linkages are not in the cyclic portion. Useful branched polysiloxazanes include polysiloxazanes that are branched at either or both the Si—N and the Si—O linkages.

A particularly useful commercially available polysilazane, KION VL 20 (available from KION Corp, Huntington Valley, Pa.), has the following structure:

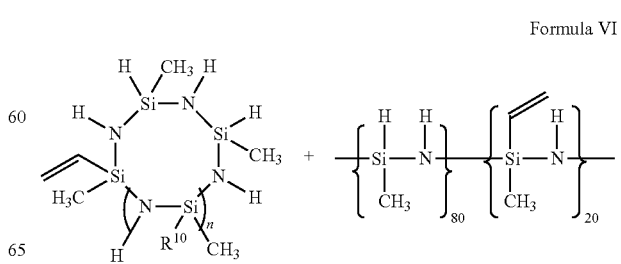   Formula VI wherein n is an integer of 1-20, and $R^{10}$ is hydrogen or a vinyl group.

Useful polysilazanes further include linear polyureasilazanes that can be represented by the following general formula:

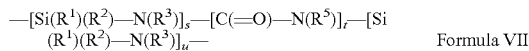
—[Si($R^1$)($R^2$)—N($R^3$)]$_s$—[C(=O)—N($R^5$)]$_t$—[Si($R^1$)($R^2$)—N($R^3$)]$_u$—     Formula VII wherein $R^1$, $R^2$, and $R^3$ are as defined above for the polysilazanes of Formulas II and V; each $R^5$ is independently hydrogen or a linear, branched, or cyclic alkyl group having fewer than about 7 carbon atoms; and s, t, and u are positive integers (preferably, the sum of s and u is at least about 10 times the magnitude of t). The number average molecular weight of the polyureasilazanes of Formula VII can range from about 160 grams per mole to about 10,000 grams per mole (preferably, from about 300 grams per mole to about 7,000 grams per mole; more preferably, from about 500 grams per mole to about 3,000 grams per mole; most preferably, from about 700 grams per mole to about 2,000 grams per mole).

Useful polysilazanes also include cyclic polyureasilazanes that can be represented by the following general formula:

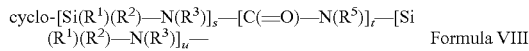
cyclo-[Si($R^1$)($R^2$)—N($R^3$)]$_s$—[C(=O)—N($R^5$)]$_t$—[Si($R^1$)($R^2$)—N($R^3$)]$_u$—     Formula VIII wherein $R^1$, $R^2$, $R^3$, $R^5$, s, t, and u are as defined above for the polysilazanes of Formula VII. The number average molecular weight of the cyclic polyureasilazanes of Formula VIII can range from about 160 grams per mole to about 3,000 grams per mole (preferably, from about 300 grams per mole to about 2000 grams per mole; more preferably, from about 350 grams per mole to about 1500 grams per mole). Other useful cyclic polyureasilazanes include those that comprise both linear and cyclic polyureasilazane moieties.

Useful branched polyureasilazanes include those generally represented by Formula VII (linear polyureasilazanes with branches) or Formula VIII (cyclic polyureasilazanes with branches), where either or both of $R^1$ and $R^2$ in at least one of the repeat units of the polyureasilazanes have the structure represented by Formula IV above.

Particularly preferred polysilazanes for use in the process of the invention include those that can be represented by general Formula I above, in which each $R^a$ and each $R^b$ is independently selected from hydrogen, alkyl (preferably, methyl), alkenyl (preferably, vinyl), aryl (preferably, phenyl), and combinations thereof (preferably, at least one of $R^a$ and $R^b$ is hydrogen); and each $R^c$ is hydrogen. Such preferred polysilazanes include homopolymers or copolymers comprising one or more of the following units:

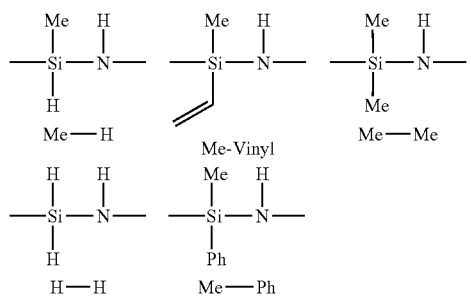

wherein Me is methyl and Ph is phenyl, as well as Vinyl-H units (that is, Me-H units wherein methyl is replaced with vinyl). The nature and amount of each such unit can vary widely, depending upon the particular application, the desired properties, and the preferred curing method (for example, if moisture curing is desired, at least some H—H content can be required). For example, useful copolymers can comprise Me-H and Vinyl-H units (for example, in a mole ratio of about 80 parts of Me-H to about 20 parts of Vinyl-H or about 60 parts of Me-H to about 40 parts of Vinyl-H); Me-H, Vinyl-H, and H—H units (for example, in a mole ratio of about 50 parts of Me-H to about 30 parts of Vinyl-H to about 20 parts of H—H); or Me-H and H—H units (for example, in a mole ratio of about 30 parts of Me-H to about 70 parts of H—H).

Fluorochemical Compounds

Fluorochemical compounds that are suitable for use in the process of the invention include those that comprise (a) at least one organofluorine or heteroorganofluorine moiety that comprises at least about six perfluorinated carbon atoms, and (b) at least one functional group that is capable of reacting with the above-described curable oligomeric or polymeric polysilazane through at least one of its chemically reactive sites (selected from silicon-nitrogen bonds, silicon-hydrogen bonds, carbon-carbon double bonds, nitrogen-hydrogen bonds, and combinations thereof). Preferably, the organofluorine or heteroorganofluorine moiety of the fluorochemical compound is a perfluorinated moiety (more preferably, a perfluoroalkyl, perfluoroalkylene, perfluoroheteroalkyl, or perfluoroheteroalkylene moiety; most preferably, a perfluoropolyether moiety).

A class of the fluorochemical compounds includes those that can be represented by the following general formula:

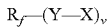
$R_f$—(Y—X)$_v$ wherein $R_f$ is a monovalent or multivalent (preferably, monovalent or divalent) linear, branched, alicyclic, or aromatic, fluorinated or perfluorinated, organic or heteroorganic group or a combination thereof comprising at least about six perfluorinated carbon atoms (preferably, a perfluorinated organic or heteroorganic group or a combination thereof comprising at least about six perfluorinated carbon atoms; more preferably, a perfluoroalkyl (for example, $C_6F_{13}$— or $C_8F_{17}$—), perfluoroalkylene, perfluoroether, or perfluoropolyether group or a combination thereof comprising at least about six perfluorinated carbon atoms; even more preferably, a perfluoroalkyl, perfluoroalkylene, or perfluoropolyether group or a combination thereof comprising at least about six perfluorinated carbon atoms; most preferably, a perfluoropolyether group comprising at least about six perfluorinated carbon atoms); each Y is independently a covalent bond or a divalent linear, branched, alicyclic, or aromatic, organic or heteroorganic linking group or a combination thereof (preferably, a covalent bond or an alkylene or heteroalkylene group or a combination thereof; more preferably, a covalent bond, an alkylene group that optionally contains at least one catenated oxygen atom, a sulfonamido group, or a combination thereof); each X is independently an electrophilic or nucleophilic group (preferably, selected from isocyanato, isothiocyanato, epoxide, amino, oxazolino, hydroxyl, mercapto, vinyl, and hydrolyzable silyl groups (for example, silyl groups comprising at least one hydrolyzable moiety such as alkoxy or acyloxy), and combinations thereof; more preferably, selected from isocyanato, epoxide, amino, oxazolino, hydroxyl, and hydrolyzable silyl groups, and combinations thereof; most preferably, isocyanato, epoxide, amino, oxazolino, hydroxyl, and combinations thereof); and v is a positive integer that equals the valency of $R_f$ (preferably, one or two). Preferably, $R_f$ (which can be saturated or unsaturated; preferably, saturated) contains from about 6 to about 35 perfluorinated carbon atoms (more preferably, from about 8 or 9 to about 25 perfluorinated carbon atoms; most preferably, from about 10 to about 17, 18, or 20 perfluorinated carbon atoms), and/or Y (which can be saturated or unsaturated; preferably, saturated) contains from about 0 to about 12 carbon atoms (more preferably, from about 1 to about 6 carbon atoms; most preferably, from about 1 to about 3 carbon atoms).

Preferred organofluorine or heteroorganofluorine moieties or $R_f$ groups include perfluoropolyether groups or segments that can be linear, branched, cyclic (preferably, alicyclic), or a combination thereof. The perfluoropolyether group or segment can be saturated or unsaturated (preferably, saturated). Representative examples of useful perfluoropolyether groups include, but are not limited to, those that have perfluorinated repeating units selected from —$(C_pF_{2p})$—, —$(C_pF_{2p}O)$—, —$(CF(Z))$—, —$(CF(Z)O)$—, —$(CF(Z)C_pF_{2p}O)$—, —$(C_pF_{2p}CF(Z)O)$—, —$(CF_2CF(Z)O)$—, and combinations thereof, wherein p is an integer of 1 to about 10 (preferably, 1 to about 8; more preferably, 1 to about 6; even more preferably, 1 to about 4; most preferably, 1 to about 3); Z is selected from perfluoroalkyl, perfluoroether, perfluoropolyether, and perfluoroalkoxy groups that are linear, branched, cyclic, or a combination thereof and that have less than or equal to about 12 carbon atoms (preferably, less than or equal to about 10 carbon atoms; more preferably, less than or equal to about 8 carbon atoms; even more preferably, less than or equal to about 6 carbon atoms; still more preferably, less than or equal to about 4 carbon atoms; most preferably, less than or equal to about 3 carbon atoms) and/or less than or equal to about 4 oxygen atoms (preferably, less than or equal to about 3 oxygen atoms; more preferably, less than or equal to about 2 oxygen atoms; most preferably, zero or one oxygen atom). In these perfluoropolyether structures, different repeating units can be combined in a block, alternating, or random arrangement to form the perfluoropolyether group.

When the perfluoropolyether group or segment is monovalent, its terminal group can be $(C_pF_{2p+1})$— or $(C_pF_{2p+1}O)$—, for example, wherein p is as defined above. Representative examples of useful monovalent perfluoropolyether groups include, but are not limited to, $C_3F_7O(CF(CF_3)CF_2O)_nCF(CF_3)$—, $C_3F_7O(CF_2CF_2CF_2O)_nCF_2$—, $CF_3O(C_2F_4O)_nCF_2$—, $CF_3O(CF_2O)_n(C_2F_4O)_qCF_2$— and $F(CF_2)_3O(C_3F_6O)_q(CF_2)_3$— (wherein n has an average value of 0 to about 50, about 1 to about 50, about 3 to about 30, about 3 to about 15, or about 3 to about 10; and q has an average value of 0 to about 50, about 3 to about 30, about 3 to about 15, or about 3 to about 10).

Representative examples of useful divalent perfluoropolyether groups include, but are not limited to, —$CF_2O(CF_2O)_n(C_2F_4O)_qCF_2$—, —$CF_2O(C_2F_4O)_qCF_2$—, —$(CF_2)_3O(C_3F_6O)_q(CF_2)_3$—, and —$CF(CF_3)(OCF_2CF(CF_3))_sOC_tF_{2t}O(CF(CF_3)CF_2O)_qCF(CF_3)$— (wherein n and q are as defined above; s has an average value of 0 to about 50, about 1 to about 50, about 3 to about 30, about 3 to about 15, or about 3 to about 10; the sum of q and s (that is, q+s) has an average value of 0 to about 50 or about 4 to about 40; the sum of q and n (that is, q+n) is greater than 0; and t is an integer of about 2 to about 6).

Preferably, the perfluoropolyether segment is monovalent or divalent, and/or the perfluoropolyether segment comprises at least one divalent hexafluoropropyleneoxy group (—$CF(CF_3)$—$CF_2O$—). Preferred perfluoropolyether segments include $F[CF(CF_3)CF_2O]_aCF(CF_3)$— (or, as represented above, $C_3F_7O(CF(CF_3)CF_2O)_nCF(CF_3)$, where n+1=a), wherein a has an average value of about 4 to about 20, and —$CF(CF_3)(OCF_2CF(CF_3))_bOCF_2CF_2CF_2CF_2O(CF(CF_3)CF_2O)_cCF(CF_3)$—, wherein b+c has an average value of about 4 to about 15. Such perfluoropolyether segments can be obtained through the oligomerization of hexafluoropropylene oxide and can be preferred because of their relatively benign environmental properties.

The fluorochemical compounds used in the process of the invention can be prepared by various different known methods. For example, an organofluorine or heteroorganofluorine moiety-containing derivative (prepared, for example, by methods comprising electrochemical fluorination or direct fluorination of an organic starting compound, or comprising oligomerization of a perfluorinated monomer) such as a methyl(di)ester, a (di)acid chloride, or a (di)acid fluoride can be reacted with a functional group-containing compound (for example, an aminoalcohol) or reduced to a dihydroalcohol (for example, with sodium borohydride). Some of the fluorochemical compounds (for example, perfluoropolyether(di)esters, (di)acids, and (di)ols, as well as certain perfluoroalkanols) are also commercially available.

Perfluoropolyether-substituted, primary and secondary amine compounds suitable for use as fluorochemical compounds can be prepared by known methods. For example, a perfluoropolyether (as described above) derivative such as a methyl ester can be reacted with a diamine compound having at least one primary amino group (for example, a diaminoalkane having from about 2 to about 6 carbon atoms, such as 1,3-diaminopropane) under a nitrogen atmosphere.

Preferred perfluoropolyether derivatives for reaction with such diamines can be obtained by oligomerization of hexafluoropropylene oxide (HFPO). Such oligomerization provides a carbonyl fluoride derivative, which can be converted to a methyl ester or other derivative by known reactions (for example, those described in U.S. Pat. No. 3,250,808 (Moore et al.), the descriptions of which are incorporated herein by reference). The carbonyl fluoride derivative prepared by such oligomerization is in the form of a mixture of compounds of varying molecular weight having varying degrees of oligomerization (that is, the derivative is not synthesized as a single compound but as a mixture of compounds with different perfluoropolyether groups). Preferably, the mixture has a number average molecular weight of at least about 400 g/mole (more preferably, at least about 800 g/mole; most preferably, at least about 1000 g/mole). For example, the number average molecular weight of the mixture can be from 400 to 10000 g/mole, 800 to 4000 g/mole, or 1000 to 3000 g/mole.

Perfluoropolyether diacyl fluorides can be prepared by the photooxidative polymerization of tetrafluoroethylene (TFE), which results in the formation of perfluoropolyether polyperoxides. The perfluoropolyether polyperoxides can be reduced by physical techniques (for example, thermal or photochemical treatment) or by chemical techniques (for example, reduction with hydrogen in the presence of noble metal catalysts such as platinum or palladium). The reduction breaks the peroxidic perfluoropolyether bonds and can give perfluoropolyethers of lower molecular weight having —COF end groups and randomly-distributed difluoromethyleneoxy and tetrafluoroethyleneoxy moieties. This synthetic method is described in more detail, for example, in U.S. Patent Application Publication No. 2003/0013923 A1 (Marchionni et al.) and in U.S. Pat. No. 5,354,922 (Marchionni et al.), the descriptions of which are incorporated herein by reference.

Perfluoropolyether acyl fluorides can also be prepared by fluoride-catalyzed oligomerization of 1,1,2,2,-tetrafluorooxetane, followed by direct fluorination (as described, for example, in U.S. Pat. Nos. 4,904,417 and 4,845,268 (Ohsaka et al.), the description of which is incorporated herein by reference). These acyl fluorides can be converted to methyl esters by using the above-referenced procedures.

Reaction to Form Curable Organofluorine-Modified Polysilazanes

The curable organofluorine-modified polysilazanes can be prepared by a process comprising (a) combining (1) at least one of the above-described curable oligomeric or polymeric polysilazanes, and (2) at least one of the above-described fluorochemical compounds; and (b) allowing or inducing the curable oligomeric or polymeric polysilazane and the fluorochemical compound to react to form at least one curable organofluorine-modified polysilazane. For example, at least one polysilazane, at least one fluorochemical compound, and, optionally, at least one aprotic solvent (for example, xylene) can be combined in essentially any order in any suitable reactor (for example, a round bottom flask equipped with a magnetic stir bar, a reflux condenser, and a nitrogen inlet), which can then be stirred and heated to a desired reaction temperature (for example, about 23° C. to about 180° C.) under a dry (for example, nitrogen) atmosphere. Optionally, the reaction can be carried out in the presence of a catalyst (for example, an acidic or basic catalyst such as those described below in the section concerning moisture curing, or a catalyst described in U.S. Pat. No. 5,616,650 (Becker et al.), the catalyst descriptions of which are incorporated herein by reference). After the reaction has run to completion, the reactor can be cooled and vented, and the reactor contents can be removed and optionally further purified.

The relative amounts of the polysilazane and the fluorochemical compound can vary widely, depending upon the nature of the fluorochemical compound and the desired properties of the curable and/or cured organofluorine-modified polysilazane. For example, the one or more fluorochemical compounds can be present in the composition in total amounts from about 0.1 to about 50 percent by weight (preferably, from about 0.1 to about 40 percent by weight; more preferably, from about 1 to about 30 percent by weight; most preferably, from about 5 to about 30 percent by weight), based upon the total weight of the polysilazane(s) and the fluorochemical compound(s).

Suitable solvents for use in the preparation include aprotic solvents such as aromatic solvents (for example, xylene, benzene, 1,2-dichlorobenzene, 1,3-dichlorobenzene, 1,4-dichlorobenzene, and the like, and mixtures thereof), ketones (for example, methylethyl ketone, cyclohexanone, and the like, and mixtures thereof), alkyl esters (for example, ethyl acetate, butyl acetate, and the like, and mixtures thereof), alkanes (for example, heptane, isoparaffinic hydrocarbons, and the like, and mixtures thereof), ethers (for example, t-butyl methyl ether, tetrahydrofuran (THF), and the like, and mixtures thereof), and the like, and mixtures thereof. Preferred solvents include aromatic solvents, alkanes, alkyl esters, and mixtures thereof; with xylene, heptane, ethyl acetate, and mixtures thereof being more preferred and xylene, heptane, and mixtures thereof most preferred.

Application and Curing of Curable Organofluorine-Modified Polysilazanes

The resulting curable organofluorine-modified polysilazanes can have relatively long shelf lives in the absence of moisture or catalyst (in the case of vinyl groups). The curable organofluorine-modified polysilazanes can be in the form of relatively viscous liquids that can be used in the surface treatment process of the invention either alone or in admixture with each other or with commonly-used solvents (for example, alkyl esters, ketones, alkanes, aromatics, and the like, and mixtures thereof).

Minor amounts of optional components can be added to the curable polysilazanes to impart particular desired properties for particular curing methods or particular surface treatment applications. Useful compositions can comprise conventional additives such as, for example, catalysts, initiators, surfactants, stabilizers, anti-oxidants, flame retardants, and the like, and mixtures thereof.

The curable organofluorine-modified polysilazanes (or a composition comprising, consisting, or consisting essentially thereof) can be used as fluorinated surface treatments to impart a degree of hydrophobicity and/or oleophobicity to a variety of substrates. Substrates suitable for use in the process of the invention (and for preparing the surface-treated articles of the invention) include those having at least one surface comprising a material that is solid and preferably substantially inert to any coating solvent that is used. Preferably, the organofluorine-modified polysilazanes can adhere to the substrate surface through chemical interactions, physical interactions, or a combination thereof (more preferably, a combination thereof).

Suitable substrates can comprise a single material or a combination of different materials and can be homogeneous or heterogeneous in nature. Useful heterogeneous substrates include coated substrates comprising a coating of a material (for example, a metal or a primer) borne on a physical support (for example, a polymeric film).

Useful substrates include those that comprise wood, glass, minerals (for example, both man-made ceramics such as concrete and naturally-occurring stones such as marble and the like), polymers (for example, polycarbonate, polyester, polyacrylate, and the like), metals (for example, copper, silver, gold, aluminum, iron, stainless steel, nickel, zinc, and the like), metal alloys, metal compounds (for example, metal oxides and the like), leather, parchment, paper, textiles, painted surfaces, and combinations thereof. Preferred substrates include glass, minerals, wood, metals, metal alloys, metal compounds, polymers, and combinations thereof (more preferably, metals, metal alloys, metal compounds, polymers, and combinations thereof). Preferably, the substrate is a polar substrate (for example, having a surface energy of greater than or equal to about 30 dynes per centimeter).

The curable organofluorine-modified polysilazanes (or, alternatively, their precursors; preferably, the curable organofluorine-modified polysilazanes) can be applied to at least a portion of at least one major surface of the substrate in essentially any manner (and with essentially any thickness) that can form a useful coating. Useful application methods include coating methods such as dip coating, spin coating, spray coating, wiping, roll coating, and the like, and combinations thereof. The organofluorine-modified polysilazanes can be applied in neat form or in the form of solvent solutions (for example, in solvents such as alkyl esters, ketones, alkanes, aromatics, and the like, and mixtures thereof). When solvent is used, useful concentrations of the curable organofluorine-modified polysilazane(s) can vary over a wide range (for example, from about 1 to about 90 weight percent), depending upon the viscosity of the curable organofluorine-modified polysilazane, the application method utilized, the nature of the substrate, and the desired surface treatment characteristics.

After application to the substrate, the curable organofluorine-modified polysilazanes (or a composition comprising, consisting, or consisting essentially thereof) can be cured by exposure to moisture (for example, if the polysilazanes have at least some H—H content, as described above), by the use of free radical initiators (for example, if the polysilazanes have at least some Me-Vinyl, Me-H, or H—H content, as described above), by the use of hydrosilation catalysts such as platinum catalysts (for example, if the polysilazanes have at least some Me-Vinyl, Me-H, or H—H content, as described above), or the like. The preferred curing method will vary, depending upon the particular surface treatment application and its accompanying requirements and conditions.

Moisture cure can be effected at temperatures ranging from room temperature (for example, about 23° C.) up to about 80° C. or more, depending upon the degree of H—H content. Moisture curing times can range from a few minutes (for example, at the higher temperatures) to hours (for example, at the lower temperatures).

Useful moisture curing catalysts are well-known in the art and include ammonia, N-heterocyclic compounds (for example, 1-methylpiperazine, 1-methylpiperidine, 4,4'-trimethylenedipiperidine, 4,4'-trimethylene-bis(1-methylpiperidine), diazobicyclo[2.2.2]octane, cis-2,6-dimethylpiperazine, and the like, and combinations thereof), mono-, di-, and trialkylamines (for example, methylamine, dimethylamine, trimethylamine, phenylamine, diphenylamine, triphenylamine, DBU (that is, 1,8-diazabicyclo[5.4.0]-7-undecene), DBN (that is, 1,5-diazabicyclo[4.3.0]-5-nonene), 1,5,9-triazacyclododecane, 1,4,7-triazacyclononane, and the like, and combinations thereof), organic or inorganic acids (for example, acetic acid, propionic acid, butyric acid, valeric acid, maleic acid, stearic acid, hydrochloric acid, nitric acid, sulfuric acid, phosphoric acid, chloric acid, hypochlorous acid, and the like, and combinations thereof), metal carboxylates, metal acetylacetonate complexes, metal powders, peroxides, metal chlorides, organometallic compounds, and the like, and combinations thereof. Preferred moisture curing catalysts include ammonia, DBU, 4,4'-trimethylene-bis(1-methylpiperidine), and combinations thereof.

When used, the moisture curing catalysts can be present in amounts ranging from about 0.1 to about 10 weight percent (preferably, from about 0.1 to about 5 weight percent; more preferably, from about 0.1 to about 2 weight percent), based upon the total weight of catalyst and curable organofluorine-modified polysilazane. The catalysts can be added before, during, or after reaction of the polysilazane and the fluorochemical compound to form the organofluorine-modified polysilazane (for curing purposes, preferably after) and can be activated at low temperatures (for example, to enable room temperature curing, as described above).

Suitable free radical initiators include organic and inorganic peroxides; alkali metal persulfates; ammonium persulfate; redox systems; aliphatic azo compounds; organic and inorganic peroxides in combination with metal or amine compounds as activators; and the like, and combinations thereof. Preferred free radical initiators include organic and inorganic peroxides (for example, hydrogen peroxide and acyl or aryl peroxides such as p-menthane hydroperoxide, ethyl ketone peroxide, benzoyl peroxide, lauroyl peroxide, tert-butyl peroxybenzoate, acetyl benzyl peroxide, p-chlorobenzoyl peroxide, alkoxy benzoyl peroxide, dicaproyl peroxide, crotonyl peroxide, di-tert-alkyl peroxide, di-tertbutyl diphosphate peroxide, peracetic acid, cyclohexyl hydroperoxide, dicumyl peroxide, and the like, and combinations thereof); and combinations thereof.

When used, the free radical initiators can be present in amounts ranging from about 0.1 to about 10 weight percent (preferably, from about 1 to about 5 weight percent), based upon the total weight of initiator and curable organofluorine-modified polysilazane. The free radical initiators can be added before, during, or after (preferably, after) reaction of the polysilazane and the fluorochemical compound to form the organofluorine-modified polysilazane and can be activated by the heat of their reaction (in some cases) or by radiation or thermal energy from an external source (for example, convection heating, induction heating, or electron beam or microwave irradiation). For example, free radically-initiated curing can be effected by heating to a temperature of about 150° C. for a period of minutes to hours (for example, about 18 hours).

Suitable hydrosilation catalysts include thermal catalysts (for example, platinum catalysts) and photocatalysts that can be effective for catalyzing a hydrosilation reaction between silicon-bonded hydrogen groups and silicon-bonded ethylenic groups. Useful thermal hydrosilation catalysts include those described, for example, in U.S. Pat. No. 2,823,218 (Speier et al.); U.S. Pat. No. 2,970,150 (Bailey); U.S. Pat. Nos. 3,159,601 and 3,159,662 (Ashby); U.S. Pat. No. 3,220,972 (Lamoreaux); U.S. Pat. No. 3,516,946 (Modic); U.S. Pat. No. 3,814,730 (Karstedt); U.S. Pat. No. 4,029,629 (Jeram); U.S. Pat. Nos. 4,533,575 and 4,504,645 (Melancon); and U.S. Pat. No. 5,741,552 (Takayama, et al.); the catalyst descriptions of which are incorporated herein by reference. Useful photocatalysts include those described, for example, in U.S. Pat. Nos. 4,510,094 and 4,530,879 (Drahnak); and U.S. Pat. No. 5,145,886 (Oxman et al.); the catalyst descriptions of which are incorporated herein by reference. Useful hydrosilation catalysts and techniques also include those described in U.S. Pat. No. 5,520,978 (Boardman et al.); the hydrosilation catalyst and technique descriptions of which are incorporated herein by reference. Combinations of thermal catalysts and photocatalysts can be used.

When used, the hydrosilation catalyst can typically be present in an amount that is effective to catalyze the hydrosilation reaction (for example, in amounts ranging from about 1 to about 1000 parts per million (ppm); preferably, from about 10 to about 500 ppm; more preferably, from about 50 to about 250 ppm), based upon the total weight of catalyst and curable organofluorine-modified polysilazane. The catalyst can be added before, during, or after (preferably, after) reaction of the polysilazane and the fluorochemical compound to form the organofluorine-modified polysilazane and can be activated by the heat of their reaction (in some cases) or by radiation (for example, ultraviolet-visible light, gamma irradiation, e-beam, or the like) or thermal energy from an external source (for example, convection heating, induction heating, irradiation, or the like). For example, platinum catalyzed curing can be effected by heating to a temperature of about 120° C. for a period of about seconds to minutes.

The curable organofluorine-modified polysilazanes can be cured to form surface treatments in the form of crosslinked hardcoats. The hardcoats can exhibit hybrid properties that can be tailored by varying the degree of crosslinking and by varying the natures and relative amounts of the starting polysilazane and the starting fluorochemical compound.

Examples

Objects and advantages of this invention are further illustrated by the following examples, but the particular materials and amounts thereof recited in these examples, as well as other conditions and details, should not be construed to unduly limit this invention. These examples are merely for illustrative purposes only and are not meant to be limiting on the scope of the appended claims.

Materials

All solvents were standard reagent grade obtained from commercial sources and were used without further purification unless specified otherwise.

Preparation of Polysilazane (PS1)

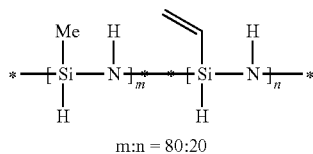

m:n = 80:20

A 2-liter, 3-necked flask equipped with a mechanical stirrer, a dry ice (that is, solid carbon dioxide)/acetone condenser, and an ammonia inlet tube was charged with hexane (800 mL), methyldichlorosilane (57.7 g, obtained from Alfa Aesar, Ward Hill, Mass.) and vinylmethyldichlorosilane (17.4 g, obtained from Alfa Aesar, Ward Hill, Mass.). Ammonia (obtained from Matheson Tri Gas, Baking Ridge, N.J.) was then slowly bubbled into the resulting mixture, and the temperature of the mixture increased. After 30 g ammonia was consumed, the reaction went slowly and some ammonia was refluxed. The reaction continued until 35 g of ammonia had been added. A resulting salt was collected on a filter. Evaporation of solvent from the resulting filtrate gave 28 g of viscous polysilazane.

Preparation of Polysilazane (PS2)

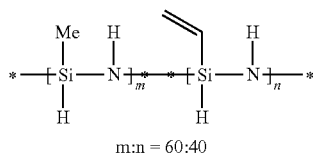

m:n = 60:40

A 5-liter, 3-necked flask equipped with a mechanical stirrer, a dry ice/acetone condenser, and an ammonia inlet tube was charged with hexane (2000 mL), methyldichlorosilane (172.5 g, obtained from Alfa Aesar, Ward Hill, Mass.), and vinylmethyldichlorosilane (141 g, obtained from Alfa Aesar, Ward Hill, Mass.). Ammonia (obtained from Matheson Tri Gas, Baking Ridge, N.J.) was then slowly bubbled into the resulting mixture, and the temperature of the mixture increased. After 143 g ammonia had been added, the reaction was stopped. A resulting salt was collected on a filter. Evaporation of solvent from the resulting filtrate gave 150 g of viscous polysilazane.

Preparation of Polysilazane (PS3)

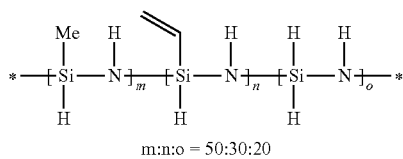

m:n:o = 50:30:20

A 2-liter, 3-necked flask equipped with a mechanical stirrer, a dry ice/acetone condenser, and an ammonia inlet tube was charged with hexane (1250 mL) and dichlorosilane (121.2 g, 0.3 mole, 25 weight percent solution in xylene, obtained from Gelest, Morrisville, Pa.). Pyridine (0.6 mole, 47.5 g, obtained from Aldrich Chemical Company, Milwaukee, Wis.) was then slowly added to the flask. Methyldichlorosilane (0.5 mole, 57.5 g, obtained from Alfa Aesar, Ward Hill, Mass.) and vinylmethyldichlorosilane (0.2 mole, 28.2 g, obtained from Alfa Aesar, Ward Hill Mass.) were next added to the flask. Ammonia (obtained from Matheson Tri Gas, Baking Ridge, N.J.) was then slowly bubbled into the resulting mixture, and the temperature of the mixture increased. After 65 g of ammonia had been added, the reaction was stopped. A resulting salt was collected on a filter. Evaporation of solvent from the resulting filtrate gave 63 g of viscous polysilazane.

Preparation of Polysilazane (PS4)

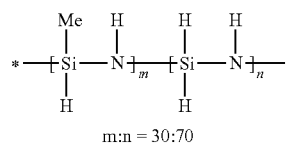

m:n = 30:70

A 2-liter, 3-necked flask equipped with a mechanical stirrer, a dry ice/acetone condenser, and an ammonia inlet tube was charged with hexane (1000 mL) and dichlorosilane (0.42 mole, 169.7 g, 25 weight percent solution in xylene, obtained from Gelest, Morrisville, Pa.). Pyridine (0.84 mole, 66.4 g, obtained from Aldrich Chemical Company, Milwaukee, Wis.) was then slowly added to the flask. Methyldichlorosilane (0.18 mole, 20.7 g, obtained from Alfa Aesar, Ward Hill, Mass.) was next added to the flask. Ammonia (obtained from Matheson Tri Gas, Baking Ridge, N.J.) was then slowly bubbled into the resulting mixture, and the temperature of the mixture increased. After 35 g of ammonia had been added, the reaction was stopped. A resulting salt was collected on a filter. Evaporation of solvent from the resulting filtrate gave 16.9 g of viscous polysilazane.

Preparation of $F(CF(CF_3)CF_2O)_aCF(CF_3)C(=O)$ $OCH_3$, wherein a Averaged 6.7

Unless otherwise noted, "HFPO—" refers to the monovalent end group $F(CF(CF_3)CF_2O)_aCF(CF_3)$— of the methyl ester $F(CF(CF_3)CF_2O)_aCF(CF_3)C(=O)OCH_3$, wherein "a" averaged about 6.7, and the methyl ester had an average molecular weight of about 1,211 g/mole. This methyl ester was prepared by essentially the method described in U.S. Pat. No. 3,250,808 (Moore et al.), the description of this method being incorporated herein by reference, with purification by fractional distillation.

This methyl ester was converted to the amidol HFPO—C $(=O)NHCH_2CH_2OH$ by treatment with monoethanolamine, essentially as described in U.S. Patent Application Publication No. 2005/0250921 (Qiu et al) on pages 6 and 7 under the procedure for FC-4.

Preparation of 2-HFPO-Oxazoline

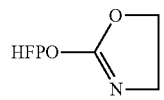

114 g (about 0.1 mole) HFPO—C(=O)NHCH$_2$CH$_2$OH (prepared as described above) was dissolved in 20 mL C$_4$F$_9$OCH$_3$ (commercially available from 3M Company, St. Paul, Minn., as NOVEC™ Engineered Fluid HFE-7100), treated with 10 mL SOCl$_2$, and the resulting mixture heated at reflux for 18 hours. The mixture was then stripped of solvent, and the resulting residue was heated for 10 hours at about 100° C. to give HFPO—C(=O)NHCH$_2$CH$_2$Cl, 20.0 g of which was slurried in about 25 mL CH$_3$OH containing 4.0 g of 25 weight percent NaOCH$_3$ in CH$_3$OH (obtained from Aldrich Chemical Company, Milwaukee, Wis.). After 20 hours at 23° C., the slurry was quenched in water and extracted with C$_4$F$_9$OCH$_3$ to yield 15.0 g 2-HFPO-oxazoline as a low-viscosity liquid. Nuclear magnetic resonance (NMR) and infrared (IR) analysis supported the structure.

Preparation of HFPO-Dihydroalcohol Glycidyl Ether

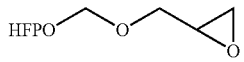

HFPO—C(=O)OCH$_3$ (prepared as described above) was reduced using sodium borohydride to prepare HFPO—CH$_2$OH, which was then alkylated with allyl bromide to form HFPO—CH$_2$OCH$_2$CH=CH$_2$ essentially as described in Example 1 of U.S. Pat. No. 7,294,731 (Flynn et al.).

13.0 g HFPO—CH$_2$OCH$_2$CH=CH$_2$ was dissolved in 15 mL t-butyl methyl ether and treated with 4 g of meta-chloroperbenzoic acid (mCPBA). A sample of the treated mixture was isolated for nuclear magnetic resonance (NMR) analysis by quenching an aliquot in 5 mL perfluoro-N-methylmorpholine (commercially available from 3M Company St. Paul, Minn., under trade designation PF5052), filtering, and concentrating. NMR revealed greater than 90 percent residual allyl groups. Another 2.0 g mCPBA was added to the mixture, and the mixture was heated on a steam bath for two hours. NMR showed 28 percent residual allyl groups. Another 3.0 g mCPBA was added to the mixture, and the mixture was stirred at reflux for 20 hours. The mixture was quenched in perfluoro-N-methylmorpholine, filtered, and concentrated to the desired glycidyl ether (6.8 g), a colorless oil.

Preparation of Perfluoropoly(methyleneoxide-co-ethyleneoxide)bis(dihydroalcohol)bis(glycidyl ether)

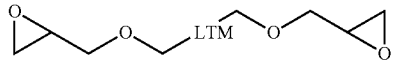

The corresponding diallyl ether (where LTM represents a divalent perfluoropolyether group having the structure —CF$_2$O(CF$_2$O)$_n$(C$_2$F$_4$O)$_q$CF$_2$—, commercially available as a diol having an equivalent weight of 950 from Solvay Solexis, Houston, Tex.) was prepared essentially as described in Example 3 of U.S. Pat. No. 7,294,731 (Flynn et al.) and epoxidized with excess meta-chloroperbenzoic acid (mCPBA) in essentially the same manner as described above for the HFPO-dihydroalcohol allylether, to provide a colorless oil.

Preparation of N-3(Trimethoxysilyl)propyl HFPO-carboxamide

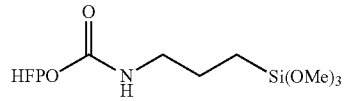

To a 1 liter round bottom flask was added 500 g (0.40255 mole) HFPO—C(=O)OCH$_3$ (prepared as described above) and 72.11 g (0.040225 mole) aminopropyl trimethoxysilane. The flask was heated to an internal temperature of 75° C. overnight in an oil bath and was monitored by Fourier transform infrared spectroscopy for disappearance of a peak at about 1790 cm$^{-1}$ and appearance of a peak at about 1710 cm$^{-1}$. The resulting mixture was then placed under a vacuum of about 0.0013 atmosphere at room temperature for 48 hours.

Preparation of Polyethyleneglycol 750 Methyl Ether Glycidyl Ether

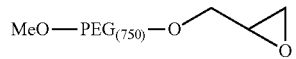

4.3 grams of sodium hydride (obtained as a 60 weight percent dispersion in mineral oil) was washed with 30 mL of hexane and then suspended in dry tetrahydrofuran (THF, 70 mL). A solution of 75 grams (0.1 mole) of methyl poly(ethylene glycol) (MeO-PEG) having a molecular weight of 750 grams per mole (obtained from Aldrich Chemical Company, Milwaukee, Wis.) in about 50 mL of dry THF was added dropwise to the suspension. The resulting viscous yellow solution was added dropwise to 37 grams of epichlorohydrin in 20 mL of dry THF. Upon heating the resulting mixture to reflux, a cloudy precipitate formed. The mixture was heated at reflux for 17 hours, cooled, filtered, and concentrated under reduced pressure to provide 71.9 grams of a product mixture. Analysis by $^1$H nuclear magnetic resonance spectroscopy indicated a 70 percent conversion of methyl poly(ethylene glycol) to its glycidyl ether. A portion (51.5 grams) of the product mixture was washed twice with 75 mL of warm hexane and concentrated under reduced pressure.

Test Methods

Method for Measuring Contact Angles

Samples were prepared as described in the following examples. The samples were rinsed for 1 minute by hand agitation in isopropyl alcohol (IPA), which was allowed to evaporate before measuring water (H$_2$O) and hexadecane (HD) contact angles (using water and hexadecane, respectively, as wetting liquids). Measurements were made using as-received, reagent-grade hexadecane and deionized water filtered through a filtration system (obtained from Millipore Corporation, Billerica, Mass.) on a video contact angle analyzer (available as product number VCA-2500XE from AST Products, Billerica, Mass.). Reported values are the averages of measurements on at least three drops measured on the right and left sides of the drops. Drop volumes were 5 microliters for static contact angle measurements and 1-3 microliters for advancing and receding contact angle measurements.

Method for Ink Repellency Test

This test was used to measure the ink repellency of coatings prepared as described in the following examples. A line was drawn across the surface of each coating using a black Sharpie™ marker (available from Sanford, Bellwood, Ill.). The coatings were rated for appearance and for ability to repel the markings of the marker.

| Ink Repellency Test Ratings | |
|---|---|
| Ranking | Description |
| 0 | Ink beaded into very fine discrete hemispherical droplets |
| 1 | Ink beaded into discrete hemispherical droplets |
| 2 | Ink beaded into discrete elongated droplets |
| 3 | Ink line narrowed and discontinuous |
| 4 | Ink line continuous and unnarrowed |

Comparative Example A 0.625 g of polysilazane PS1 (prepared as described above) and 0.0136 g of dicumyl peroxide were dissolved in 5 g of ethyl acetate. The resulting solution was coated on an aluminum plate and cured at 150° C. for 18 hours.

Example 1

A solution of

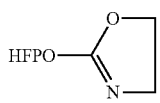

(0.2 g; prepared as described above) and polysilazane PS1 (2 g; prepared as described above) in xylene (2 g) was heated to 130° C. for 4 hours. When the resulting homogenous solution was cooled to room temperature, two layers formed. The solution was diluted with 12 g of ethyl acetate. Then, 0.0136 g of dicumyl peroxide was added to 5 g of the solution, and the resulting solution was coated on an aluminum plate and cured at 150° C. for 18 hours.

Example 2

Example 2 was carried out in essentially the same manner as Example 1, except that

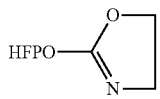

was replaced with 0.2 g of

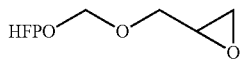

(prepared as described above).

Example 3

Example 3 was carried out in essentially the same manner as Example 1, except that

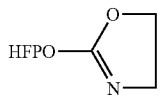

was replaced with

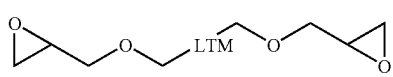

(0.2 g; prepared as described above) and a hazy solution, instead of a homogeneous solution, was obtained.

Comparative Example B

A solution of

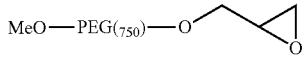

(2 g; prepared as described above) and polysilazane PS1 (2 g; prepared as described above) was heated to 130° C. for 1 hour, resulting in a homogenous solution. To the homogeneous solution, 0.047 g of dicumyl peroxide was added, and the resulting solution was coated on an aluminum plate and cured at 150° C. for 18 hours.

Comparative Example C

A solution of

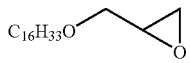

(0.4 g; obtained from Aldrich Chemical Company, Milwaukee, Wis.) and polysilazane PS1 (2 g; prepared as described above) was heated to 130° C. for 45 minutes, resulting in a homogenous solution. To the homogeneous solution, 0.017 g of dicumyl peroxide was added. The resulting solution was coated on an aluminum plate and cured at 150° C. for 18 hours.

Example 4

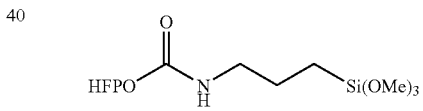

(prepared as described above; number average molecular weight, $M_n$, about 1400; 0.1 g) and polysilazane PS1 (prepared as described above; 1 g) were combined and heated to 130° C. for 4 hours, and then 0.035 g of dicumyl peroxide was added to the resulting solution. The solution was coated on an aluminum plate and cured at 150° C. for 8 hours.

Example 5

$CF_3(CF_2)_5CH_2CH_2OH$ (0.1 g; commercially available from Aldrich Chemical Company, Milwaukee, Wis.) and polysilazane PS1 (1 g; prepared as described above) were combined and heated to 130° C. for 4 hours, and then 0.035 g of dicumyl peroxide was added to the combination. The resulting solution was coated on an aluminum plate and cured at 150° C. for 8 hours.

The coated samples of Comparative Examples A, B, and C and of Examples 1-5 were tested for their water and hexadecane contact angles and for ink repellency, according to the procedures described above. The results are reported in Table 1 below.

TABLE 1

| Example Number | Water Contact Angle | | | Hexadecane Contact Angle | | | Ink Repellency |
|---|---|---|---|---|---|---|---|
| | Static | Advancing | Receding | Static | Advancing | Receding | |
| C-A | 103.45 | 105.6 | 96.0 | 37.0 | 36.9 | 32.0 | 1 |
| 1 | 101.3 | 109.8 | 94.8 | 52.2 | 49.4 | 45.7 | 1 |
| 2 | 108.9 | 118.9 | 101.0 | 64.3 | 61.1 | 55.7 | 0 |
| 3 | 108.7 | 111.1 | 102.8 | 61.7 | 60.0 | 58.1 | 0 |
| C-B | 90.0 | 95.0 | 77.0 | 43.0 | 45.0 | 35.0 | 4 |
| C-C | 100.0 | 108.0 | 89.0 | 32.0 | 33.0 | 32.0 | 3 |
| 4 | 108.4 | 114.3 | 100.1 | 60.6 | 60.7 | 53.6 | 0 |
| 5 | 102.8 | 109.6 | 97.0 | 36.9 | 37.2 | 35.0 | 1 |

Comparative Example D 0.25 g of polysilazane PS1 (prepared as described above) and 0.364 g of 0.373 weight percent Pt(O)-Me$_2$Si(CH=CH$_2$)$_2$ solution in toluene (obtained from Aldrich Chemical Company, Milwaukee, Wis.) were dissolved in 2 g of ethyl acetate. The resulting solution was coated on an aluminum plate and cured at 120° C. for 5 hours.

Example 6

A solution of

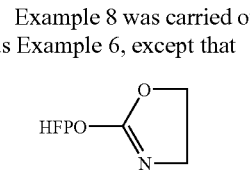

(0.2 g; prepared as described above) and polysilazane PS1 (2 g; prepared as described above) in xylene (2 g) was heated to 130° C. for 4 hours. When the resulting homogenous solution was cooled to room temperature, two layers were formed. This solution was diluted with ethyl acetate (12 g), and 0.364 g of 0.373 weight percent Pt(O)-Me$_2$Si(CH=CH$_2$)$_2$ in toluene (obtained from Aldrich Chemical Company, Milwaukee, Wis.) was added to 2 g of the solution. The resulting solution was coated on an aluminum plate and cured at 120° C. for 5 hours.

Example 7

Example 7 was carried out in essentially the same manner as Example 6, except that

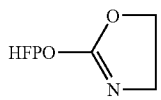

was replaced with 0.2 g of

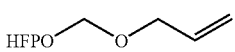

(prepared as described above).

Example 8

Example 8 was carried out in essentially the same manner as Example 6, except that

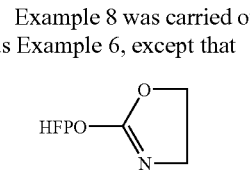

was replaced with 0.2 g of

(prepared as described above).

Example 9

HFPO—O—CH$_2$—CH=CH$_2$ (0.1 g; prepared as described above), polysilazane PS1 (1 g; prepared as described above), 0.22 g of 0.373 weight percent Pt(O)-Me$_2$Si(CH=CH$_2$)$_2$ in toluene (obtained from Aldrich Chemical Company, Milwaukee, Wis.), and t-butyl methyl ether (2 g) were mixed to form a clear solution. The solution was coated on an aluminum plate and cured at 120° C. for 5 hours.

The coated samples of Comparative Example D and of Examples 6-9 were tested for their water and hexadecane contact angles and for ink repellency, according to the procedures described above. The results are reported in Table 2 below.

TABLE 2

| Example Number | Water Contact Angle | | | Hexadecane Contact Angle | | | Ink Repellency |
|---|---|---|---|---|---|---|---|
| | Static | Advancing | Receding | Static | Advancing | Receding | |
| C-D | 102.8 | 110.6 | 79.5 | 34.3 | 35.0 | 24.2 | 3 |
| 6 | 106.0 | 118.4 | 81.0 | 69.5 | 65.8 | 55.2 | 1 |
| 7 | 126.3 | 128.5 | 89.6 | 67.1 | 71.8 | 55.1 | 1 |

TABLE 2-continued

| Example | Water Contact Angle | | | Hexadecane Contact Angle | | | Ink |
|---|---|---|---|---|---|---|---|
| Number | Static | Advancing | Receding | Static | Advancing | Receding | Repellency |
| 8 | 106 | 109.1 | 97.0 | 62.6 | 58.3 | 57.5 | 0 |
| 9 | 112.1 | 121.0 | 105.1 | 69.9 | 64.4 | 56.5 | 0 |

Comparative Example E

A solution of polysilazane PS2 (0.25 g; prepared as described above), ethyl acetate (5 g), and 0.01 g of dicumyl peroxide was coated on an aluminum plate and cured at 150° C. for 18 hours.

Example 10

A solution of

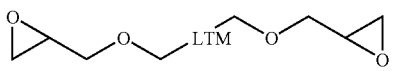

(0.2 g; prepared as described above) and polysilazane PS2 (2 g; prepared as described above) in xylene (2 g) was heated to 130° C. for 4 hours, resulting in a hazy solution, which, when cooled to room temperature, formed two layers. The solution was then diluted with ethyl acetate (12 g), and 0.036 g of dicumyl peroxide was added to 5 g of the diluted solution. The solution was coated on an aluminum plate and cured at 150° C. for 18 hours.

The coated samples of Comparative Example E and of Example 10 were tested for their water and hexadecane contact angles and for ink repellency, according to the procedures described above. The results are reported in Table 3 below.

TABLE 3

| Example | Water Contact Angle | | | Hexadecane Contact Angle | | | Ink |
|---|---|---|---|---|---|---|---|
| Number | Static | Advancing | Receding | Static | Advancing | Receding | Repellency |
| C-E | 89.4 | 96.5 | 77.8 | 31.4 | 29.4 | 25.1 | 3-4 |
| 10 | 108.0 | 112.3 | 102.8 | 62.9 | 61.6 | 57.5 | 1 |

Comparative Example F

A solution of polysilazane PS2 (0.25 g; prepared as described above), ethyl acetate (5.75 g), and 0.364 g of 0.373 weight percent Pt(O)-Me$_2$Si(CH=CH$_2$)$_2$ in toluene (obtained from Aldrich Chemical Company, Milwaukee, Wis.) was prepared. The solution was coated on an aluminum plate and cured at 120° C. for 5 hours.

Example 11

A solution of

(0.2 g; prepared as described above) and polysilazane PS2 (2 g; prepared as described above) in xylene (2 g) was heated to 130° C. for 4 hours, resulting in a hazy solution, which, when cooled to room temperature, formed two layers. The solution was diluted with t-butyl methyl ether (12 g), and 0.364 g of 0.373 weight percent Pt(O)-Me$_2$Si(CH=CH$_2$)$_2$ in toluene was added to 2 g of the diluted solution. The solution was coated on an aluminum plate and cured at 120° C. for 16 hours.

The coated samples of Comparative Example F and of Example 11 were tested for their water and hexadecane contact angles and for ink repellency, according to the procedures described above. The results are reported in Table 4 below.

TABLE 4

| Example | Water Contact Angle | | | Hexadecane Contact Angle | | | Ink |
|---|---|---|---|---|---|---|---|
| Number | Static | Advancing | Receding | Static | Advancing | Receding | Repellency |
| C-F | 88.4 | 97.2 | 66.0 | 12.3 | 15.2 | 10.4 | 4 |
| 11 | 108.9 | 111.6 | 97.9 | 61.7 | 58.8 | 56.8 | 1 |

Example 12

A solution of

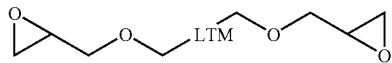

(0.08 g; prepared as described above) and polysilazane PS3 (2 g; prepared as described above) in xylene (2 g) was heated to 130° C. for 10 hours, resulting in a hazy solution, which, when cooled to room temperature, formed two layers. The solution was diluted with t-butyl methyl ether (13.3 g) to form a clear solution. 1 g of the clear solution (0.116 g solid) was mixed with 0.013 g 1,8-diazabicyclo[5.4.0]-7-undecene (DBU, obtained from ICI America, Portland, Oreg.) and coated on aluminum plates. The resulting coatings dried to touch within minutes after the solvent had evaporated (in contrast with a corresponding coating without DBU).

Some of the dried coated samples of Example 12 were further cured at room temperature and their water and hexadecane contact angles and ink repellency were tested (according to the procedures described above) as a function of curing time. The results are reported in Table 5 below.

TABLE 5

| Curing Time (minutes) | Water Contact Angle | | | Hexadecane Contact Angle | | | Ink Repellency |
|---|---|---|---|---|---|---|---|
| | Static | Advancing | Receding | Static | Advancing | Receding | |
| 10-13 | 96.9 | 117.2 | 98.2 | 57.3 | 55.8 | 46.2 | 1-2 |
| 25-28 | 96.9 | 104.8 | 99.4 | 57.2 | 56.8 | 47.5 | 1 |
| 210 | 98.8 | 98.1 | 95.5 | 60.8 | 58.1 | 53.5 | 1 |
| 1320 | 99.7 | 96.9 | 94.5 | 60.6 | 57.2 | 57.2 | 1 |
| 7080 | 98.1 | 97.5 | 93.9 | 60.9 | 56.2 | 56.6 | 1 |

In addition, some of the dried coated samples of Example 12 were further cured at 70° C. for 2 days and then their water and hexadecane contact angles and ink repellency were tested, according to the procedures described above. The results are reported in Table 6 below.

TABLE 6

| Water Contact Angle | | | Hexadecane Contact Angle | | | Ink Repellency |
|---|---|---|---|---|---|---|
| Static | Advancing | Receding | Static | Advancing | Receding | |
| 105.9 | 95.8 | 94.7 | 63.4 | 61.3 | 58.3 | 1 |

In addition, some of the dried coated samples of Example 12 were further cured at 80° C. and their water and hexadecane contact angles and ink repellency were tested (according to the procedures described above) as a function of curing time. The results are reported in Table 7 below.

TABLE 7

| Curing Time (minutes) | Water Contact Angle | | | Hexadecane Contact Angle | | | Ink Repellency |
|---|---|---|---|---|---|---|---|
| | Static | Advancing | Receding | Static | Advancing | Receding | |
| 5 | 98.8 | 98.9 | 97.7 | 61.5 | 57.6 | 57.1 | 1 |
| 15 | 100.3 | 99.1 | 97.1 | 60.7 | 57.9 | 56.6 | 1 |
| 30 | 101.1 | 101.3 | 99.2 | 59.8 | 57.5 | 57.9 | 1 |
| 314 | 100.8 | 99.7 | 97.4 | 60.6 | 57.0 | 55.8 | 1 |

In addition, some of the dried coated samples of Example 12 were further cured at 150° C. and their water and hexadecane contact angles and ink repellency were tested (according to the procedures described above) as a function of curing time. The results are reported in Table 8 below.

TABLE 8

| Curing Time (minutes) | Water Contact Angle | | | Hexadecane Contact Angle | | | Ink Repellency |
|---|---|---|---|---|---|---|---|
| | Static | Advancing | Receding | Static | Advancing | Receding | |
| 5 | 109.1 | 109.6 | 85.8 | 62.6 | 58.8 | 57.9 | 0 |
| 15 | 106.9 | 109.1 | 89.2 | 61.6 | 60.2 | 59.6 | 0 |
| 30 | 106.4 | 111.7 | 92.1 | 65.1 | 59.1 | 57.7 | 0 |
| 314 | 108.5 | 112.4 | 102.4 | 63.5 | 61.7 | 59.6 | 0 |

Comparative Example G

A solution of polysilazane PS4 (0.157 g; prepared as described above), ethyl acetate (2 g), and 0.0147 g 1,8-diazabicyclo[5.4.0]-7-undecene (DBU, obtained from ICI America, Portland, Oreg.) was prepared. The solution was coated on aluminum plates and heated at 70° C. for 60 hours. The resulting coatings were tested for their water and hexadecane contact angles and ink repellency, according to the procedures described above. The results are reported in Table 9 below.

TABLE 9

| Water Contact Angle | | | Hexadecane Contact Angle | | | Ink Repellency |
|---|---|---|---|---|---|---|
| Static | Advancing | Receding | Static | Advancing | Receding | |
| 89.3 | 104.4 | 69.9 | 21.8 | 22.9 | 16.5 | 4 |

Example 13

A solution of

(0.08 g; prepared as described above) and polysilazane PS4 (2 g; prepared as described above) in xylene (2 g) was heated to 130° C. for 10 hours, resulting in a hazy solution, which, when cooled to room temperature, formed two layers. The solution was diluted with ethyl acetate (12 g) to form a clear solution. 1 g of the clear solution (0.116 g solid) was mixed with 0.013 g 1,8-diazabicyclo[5.4.0]-7-undecene (DBU, obtained from ICI America, Portland, Oreg.) and coated on aluminum plates. The resulting coatings solidified very quickly (in contrast with a corresponding coating without DBU) at 70° C.

The dried coatings of Example 13 were tested for their water and hexadecane contact angles and ink repellency (according to the procedures described above) as a function of curing time. The results are reported in Table 10 below.

TABLE 10

| Curing Time (minutes) | Water Contact Angle | | | Hexadecane Contact Angle | | | Ink Repellency |
|---|---|---|---|---|---|---|---|
| | Static | Advancing | Receding | Static | Advancing | Receding | |
| 5 | 81.4 | 106.4 | 70.5 | 19.6 | 23.5 | 19.4 | 4 |
| 15 | 76.1 | 102.5 | 60.3 | 21.9 | 34.2 | 21.1 | 4 |
| 70 | 85.9 | 112.5 | 57.6 | 13.4 | 17.5 | 13.6 | 4 |

The referenced descriptions contained in the patents, patent documents, and publications cited herein are incorporated by reference in their entirety as if each were individually incorporated. Various unforeseeable modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only, with the scope of the invention intended to be limited only by the claims set forth herein as follows.

We claim:
1. A process comprising
   (a) providing at least one substrate having at least one major surface;
   (b) combining
      (1) at least one curable oligomeric or polymeric polysilazane comprising at least one chemically reactive site selected from silicon-nitrogen bonds, silicon-hydrogen bonds, carbon-carbon double bonds, nitrogen-hydrogen bonds, and combinations thereof, and
      (2) at least one fluorochemical compound comprising
         (i) at least one organofluorine or heteroorganofluorine moiety that comprises at least six perfluorinated carbon atoms, and
         (ii) at least one functional group that is capable of reacting with said curable oligomeric or polymeric polysilazane through at least one of said chemically reactive sites,
      wherein said fluorochemical compound is one of a class that is represented by the following general formula:

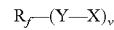

wherein $R_f$ is a monovalent or multivalent linear, branched, alicyclic, or aromatic, fluorinated or perfluorinated, organic or heteroorganic group or a combination thereof; each Y is independently a covalent bond or a divalent linear, branched, alicyclic, or aromatic, organic or heteroorganic linking group or a combination thereof; each X is independently an electrophilic or nucleophilic group selected from isocyanato, isothiocyanato, epoxide, amino, oxazolino, mercapto, vinyl, and combinations thereof; and v is a positive integer that equals the valency of $R_f$;

(c) allowing or inducing said curable oligomeric or polymeric polysilazane and said fluorochemical compound to react to form at least one curable organofluorine-modified polysilazane;

(d) applying said curable organofluorine-modified polysilazane, or said curable oligomeric or polymeric polysilazane and said fluorochemical compound, to at least a portion of at least one said major surface of said substrate; and (e) curing said curable organofluorine-modified polysilazane to form a surface treatment.

2. The process of claim 1, wherein said substrate is selected from wood, glass, minerals, polymers, metals, metal alloys, metal compounds, leather, parchment, paper, textiles, painted surfaces, and combinations thereof.

3. The process of claim 1, wherein said polysilazane has a main chain comprising structural units having the following general formula:

$$-[Si(R^a)(R^b)-N(R^c)]\qquad \text{Formula I}$$

wherein each said $R^a$, each said $R^b$, and each said $R^c$ is independently hydrogen, an organic group, a heteroorganic group, or a combination thereof.

4. The process of claim 3, wherein said organic and heteroorganic groups are selected from alkyl, alkenyl, cycloalkyl, aryl, aralkyl, alkylsilyl, arylsilyl, alkylamino, arylamino, alkoxy, aryloxy, aralkyloxy, and combinations thereof; and/or wherein said organic and heteroorganic groups have from 1 to 18 carbon atoms.

5. The process of claim 3, wherein each said $R^a$ and each said $R^b$ is selected from hydrogen, alkyl, alkenyl, aryl, and combinations thereof; and each said $R^c$ is hydrogen.

6. The process of claim 5, wherein said alkyl is methyl, said alkenyl is vinyl, and said aryl is phenyl.

7. The process of claim 1, wherein said polysilazane has a linear, branched, or cyclic structure, or a combination thereof, and/or has a number average molecular weight of 100 to 50,000.

8. The process of claim 1, wherein said organofluorine or heteroorganofluorine moiety of said fluorochemical compound is a perfluorinated moiety.

9. The process of claim 1, wherein said organofluorine or heteroorganofluorine moiety of said fluorochemical compound is a perfluoroalkyl, perfluoroalkylene, perfluoroheteroalkyl, or perfluoroheteroalkylene moiety.

10. The process of claim 1, wherein said organofluorine or heteroorganofluorine moiety is a perfluoropolyether moiety.

11. The process of claim 1, wherein said $R_f$ contains from 6 to 35 carbon atoms; and/or wherein said $R_f$ is monovalent or divalent and said v is one or two; and/or wherein said $R_f$ is a perfluorinated organic or heteroorganic group or a combination thereof.

12. The process of claim 11, wherein said perfluorinated organic or heteroorganic group is selected from perfluoroalkyl, perfluoroalkylene, perfluoroether, perfluoropolyether, and combinations thereof.

13. The process of claim 1, wherein said $R_f$ group is a perfluoroalkyl or perfluoroalkylene group.

14. The process of claim 1, wherein said $R_f$ group is a perfluoropolyether group.

15. The process of claim 14, wherein said perfluoropolyether group is monovalent or divalent, and/or said perfluoropolyether group comprises at least one divalent hexafluoropropyleneoxy group ($-CF(CF_3)-CF_2O-$); and/or wherein said perfluoropolyether group is selected from $F[CF(CF_3)CF_2O]_aCF(CF_3)-$, wherein a has an average value of about 4 to about 20, and $-CF(CF_3)(OCF_2CF(CF_3))_bOCF_2CF_2CF_2O(CF(CF_3)CF_2O)_cCF(CF_3)-$, wherein b+c has an average value of about 4 to about 15.

16. The process of claim 1, wherein said Y is a covalent bond or an alkylene or heteroalkylene group or a combination thereof and/or wherein said X is selected from isocyanato, epoxide, amino, oxazolino, and combinations thereof.

17. The process of claim 1, wherein said applying is carried out by a coating method selected from dip coating, spin coating, spray coating, wiping, roll coating, and combinations thereof; and/or wherein said curing is carried out by a curing method selected from moisture curing, free radical initiation, hydrosilation, or a combination thereof.

18. A process comprising
(a) providing at least one substrate having at least one major surface;
(b) combining
  (1) at least one curable oligomeric or polymeric polysilazane comprising at least one chemically reactive site selected from silicon-nitrogen bonds, silicon-hydrogen bonds, carbon-carbon double bonds, nitrogen-hydrogen bonds, and combinations thereof, wherein said polysilazane has a main chain comprising structural units having the following general formula:

$$-[Si(R^a)(R^b)-N(R^c)]-\qquad \text{Formula I}$$

wherein each said $R^a$ and each said $R^b$ is selected from hydrogen, alkyl, alkenyl, aryl, and combinations thereof; and each said $R^c$ is hydrogen; and
  (2) at least one fluorochemical compound comprising
    (i) at least one organofluorine or heteroorganofluorine moiety selected from perfluoroalkyl, perfluoroalkylene, perfluoroether, and perfluoropolyether comprising at least six perfluorinated carbon atoms, and
    (ii) at least one functional group that is capable of reacting with said curable oligomeric or polymeric polysilazane through at least one said chemically reactive site, said functional group being selected from isocyanato, isothiocyanato, epoxide, amino, oxazolino, mercapto, vinyl, and combinations thereof;
(c) allowing or inducing said curable oligomeric or polymeric polysilazane and said fluorochemical compound to react to form at least one curable organofluorine-modified polysilazane;
(d) applying said curable organofluorine-modified polysilazane, or said curable oligomeric or polymeric polysilazane and said fluorochemical compound, to at least a portion of at least one said major surface of said substrate; and
(e) curing said curable organofluorine-modified polysilazane to form a surface treatment.

* * * * *

UNITED STATES PATENT AND TRADEMARK OFFICE
CERTIFICATE OF CORRECTION

PATENT NO. : 8,329,830 B2  
APPLICATION NO. : 12/792153  
DATED : December 11, 2012  
INVENTOR(S) : Yu Yang et al.

Page 1 of 2

It is certified that error appears in the above-identified patent and that said Letters Patent is hereby corrected as shown below:

In the Specifications

Column 7,  
Line 14, delete "oft)." and insert --of t).--, therefor.

Column 9,  
Line 40, delete " $C_3F_7O(CF_2CF_2CF_2O)_nCF_2$— " and insert -- $C_3F_7O(CF_2CF_2CF_2O)_nCF_2CF_2$— ,--, therefor.

Column 21,  
Line 17, delete "Pt(O)" and insert --Pt(0)--, therefor.

Column 21,  
Line 35, delete "Pt(O)" and insert --Pt(0)--, therefor.

Column 22,  
Line 48, delete "Pt(O)" and insert --Pt(0)--, therefor.

Column 23,  
Line 55, delete "Pt(O)" and insert --Pt(0)--, therefor.

Column 24,  
Line 36, delete "Pt(O)" and insert --Pt(0)--, therefor.

Signed and Sealed this  
Fourteenth Day of May, 2013

Teresa Stanek Rea  
*Acting Director of the United States Patent and Trademark Office*

CERTIFICATE OF CORRECTION (continued)
U.S. Pat. No. 8,329,830 B2

In the Claims

Column 29,

Line 30, Claim 3, delete "$-[Si(R^a)(R^b)-N(R^c)]$" and insert -- $-[Si(R^a)(R^b)-N(R^c)]-$ --, therefor.

Column 30,
Line 16, Claim 16, delete "thereof" and insert --thereof;--, therefor.